(12) United States Patent
Xiaoxian (10) Patent No.: US 11,910,959 B2
(45) Date of Patent: Feb. 27, 2024

(54) ELECTRIC GRINDER

(71) Applicant: Zhuhai Kelitong Electronic Co., Ltd., Zhuhai (CN)

(72) Inventor: Song Xiaoxian, Zhuhai (CN)

(73) Assignee: Zhuhai Kelitong Electronic Co., Ltd., Zhuhai (CN)

(\*) Notice: Subject to any disclaimer, the term of this patent is extended or adjusted under 35 U.S.C. 154(b) by 0 days.

(21) Appl. No.: 17/745,381

(22) Filed: May 16, 2022

(65) Prior Publication Data
US 2023/0301462 A1   Sep. 28, 2023

(51) Int. Cl.
*A47J 42/40* (2006.01)
*A47J 42/00* (2006.01)
*A47J 42/46* (2006.01)
*A47J 42/56* (2006.01)

(52) U.S. Cl.
CPC .............. *A47J 42/40* (2013.01); *A47J 42/46* (2013.01); *A47J 42/56* (2013.01)

(58) Field of Classification Search
CPC .. A47J 42/36; A47J 42/40; A47J 42/46; A47J 42/56
See application file for complete search history.

(56) References Cited

U.S. PATENT DOCUMENTS

| | | | | |
|---|---|---|---|---|
| 1,143,656 A | * | 6/1915 | Spahr | B65D 39/06 |
| | | | | 222/548 |
| 6,443,378 B1 | * | 9/2002 | Huang | A47J 42/02 |
| | | | | 241/169.1 |
| 2004/0211848 A1 | * | 10/2004 | Mulle | A47J 42/56 |
| | | | | 241/36 |
| 2010/0108793 A1 | * | 5/2010 | Wu | A47J 42/44 |
| | | | | 241/258 |
| 2013/0153698 A1 | * | 6/2013 | Zhang | A47J 42/40 |
| | | | | 241/169.1 |

FOREIGN PATENT DOCUMENTS

| | | | |
|---|---|---|---|
| CN | 201420342410 U | | 11/2014 |
| CN | 201420823650.1 | | 4/2019 |
| CN | 209186447 U | | 8/2019 |
| CN | 212015352 U | * | 11/2020 |
| CN | 212015352 U | | 11/2020 |
| GB | 2189378 A | * | 10/1987 ............. A47G 19/12 |

OTHER PUBLICATIONS

English translate (CN212015352U), retrieved date May 16, 2023.*

\* cited by examiner

*Primary Examiner* — Matthew Katcoff
*Assistant Examiner* — Mohammed S. Alawadi
(74) *Attorney, Agent, or Firm* — Boyle Fredrickson, S.C.

(57) ABSTRACT

The present patent discloses an electric grinder, comprising a shell, a motor assembly, a grinding assembly and a dust cover. The motor assembly and grinding assembly are provided in the shell, and an opening is provided at one end of said shell. The dust cover comprises a cover and a counterweight part, and can open or close the opening of the shell under the gravity of the counterweight part. In the electric grinder provided by the present invention, when the opening of the grinder faces downward, the dust cover can open automatically. When the opening of the grinder faces upward, rotating the dust cover can close and engage with the opening of the dust cover automatically. Thus, the present invention prevents the feed opening of the electric grinder from being exposed to air when the user forgets to close the dust cover.

9 Claims, 7 Drawing Sheets

ELECTRIC GRINDER

CROSS-REFERENCE TO RELATED APPLICATION

This application claims priority to Chinese Patent Application 202220673748.8 filed on Mar. 25, 2022, the entire contents of which are hereby expressly incorporated by reference into the present application.

TECHNICAL FIELD

The present patent relates to the technical field of daily life utensils, especially an electric grinder.

BACKGROUND ART

Since processed ground pepper, pepper salt, etc. available on the market differ greatly from freshly ground seasonings in flavor, more and more consumers choose pepper grinders. By buying complete pepper particles and grinding them in a grinder, they can get natural and fresh ground pepper, pepper salt, etc.

Grinders currently available include both manual and electric grinders, and consumers can choose grinders suited to them based on actual needs. For example, the Chinese patent application (publication number: CN209186447U) published on Aug. 2, 2019 discloses a powder grinder, comprising a bottle, wherein a grinding device is provided at the mouth of said bottle, said grinding device comprises a rotatable rotating part engaged at the opening of said bottle, an inner core and an outer core that match each other are provided in said rotating part, grinding structures that match each other are provided on the outer wall of said inner core and the inner wall of said outer core, said inner core is supported by the inner core fixture in the opening of said bottle, said outer core is supported by the outer core fixture above the inner core fixture, an adjusting part that engages with it is provided on the top of said rotating part, and a dust cover is provided on the top of said adjusting part. The powder grinder of the present application adopts a worm and gear structure formed by an adjusting part and a rotating part, and has to rotate by 60° only to realize adjustment, thereby improving operating efficiency, improving the product's overall stability, and grinding materials more easily and conveniently.

Although an electric grinder is more rational in structure and easier to operate, its dust cover is fastened on the top of the adjusting part. When the user forgets to fasten the dust cover, the pepper or ground pepper stored in the grinder will certainly be exposed to outside air for a long time, so that the flavor of the ground pepper will worsen, leading to a waste. In addition, the grinder is usually placed with the opening facing up. When the user forgets to fasten the dust cover, dust and other contaminants will enter the feed opening for grinding particles, so that the seasoning will be contaminated.

What is needed is a pepper grinder that addresses any of the shortcomings of the prior art discussed above.

SUMMARY OF INVENTION

The present patent provides an electric grinder that prevents the seasoning from being contaminated, and is simple in structure and easy to operate, which is realized through the following technical solution: An electric grinder, comprising a shell, a motor assembly, a grinding assembly and a dust cover, wherein said motor assembly and said grinding assembly are provided in said shell, an opening is provided at one end of said shell, said dust cover is rotatably connected to said shell, said dust cover comprises a cover and a counterweight part, and said dust cover can open or close the opening of said shell under the gravity of said counterweight part.

This design has the following advantages: The present application sets a dust cover at the opening of the shell, and the dust cover can open or close the opening of the shell, thereby preventing dust from entering the feed opening effectively. In addition, the dust cover comprises a cover and a counterweight part, and said dust cover can open or close the opening of said shell under the gravity of said counterweight part. When the opening of the grinder faces up, the rotatably provided dust cover can close and engage with the opening of the shell automatically, thereby preventing the feed opening of the electric grinder from being exposed to air when the user forgets to close the dust cover.

These and other aspects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof. It is hereby disclosed that the invention includes all such modifications.

Reference numbers in the attached drawings identify the following features: 1: shell; 11: opening; 12: discharge cover; 121: discharge part; 122: containing part; 123: shaft hole; 124: groove; 13: enclosure; 14: inner front shell; 15: inner rear shell; 16: storage bin cover; 17: storage bin; 2: motor assembly; 3: grinding assembly; 4: dust cover; 41: cover; 42: counterweight part; 421: cavity; 422: counterweight block; 43: rotating shaft; 44: convex rib; 5: driving shaft; 6: battery pack

SPECIFIC EMBODIMENTS

The present patent is further described in detail by reference to the attached drawings and specific embodiments.

Figure 1:
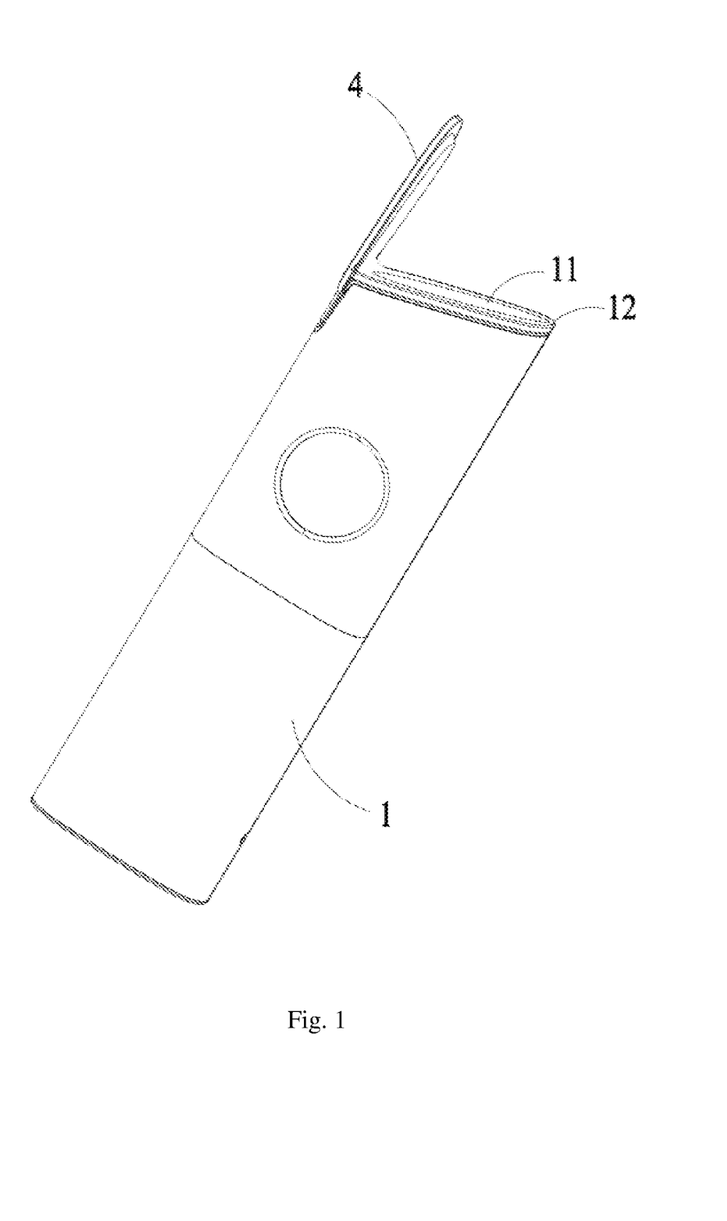
FIG. 1 is an overall structural diagram of the electric grinder in the present application.
Figure 7:
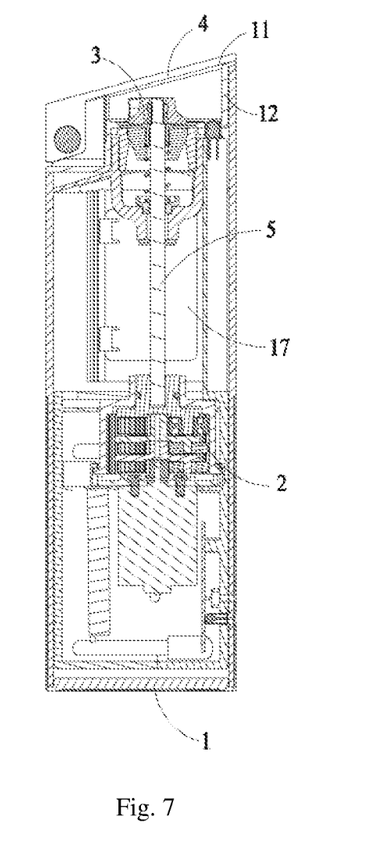
FIG. 7 is a profile of the electric grinder in the closed state in the present application.

As shown in FIG. 1 and FIG. 7, which are overall structural diagrams of the electric grinder, the electric grinder provided in the present embodiment including a shell 1, a motor assembly 2 and a grinding assembly 3, wherein said motor assembly 2 and said grinding assembly 3 are provided in said shell 1. During use, pepper or sea salt particles, etc. are loaded into the electric grinder, and the motor assembly 2 drives the grinding assembly 3 to realize the automatic grinding function of the electric grinder.

Figure 2:
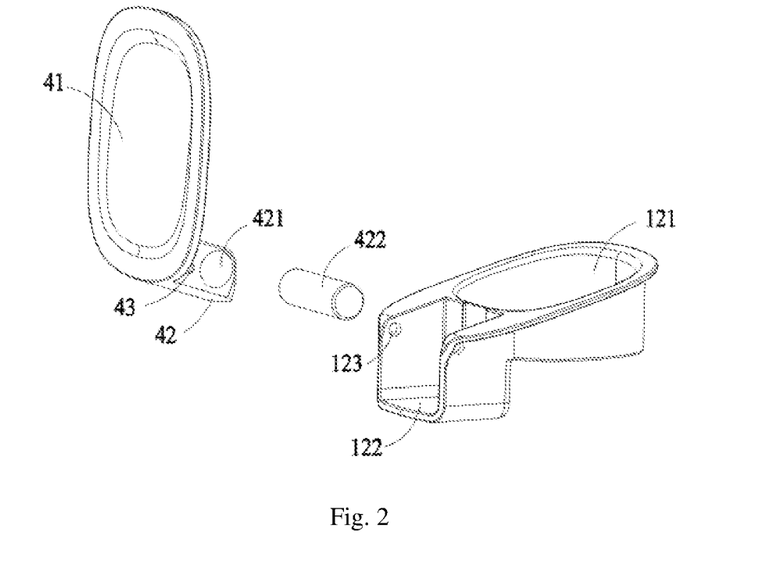
FIG. 2 is an exploded view of matching between the dust cover and the discharge cover in the present application.

As shown in FIG. 2, the electric grinder of the present embodiment also comprises a dust cover 4, wherein an opening 11 is provided at one end of said shell 1, said dust cover 4 is rotatably connected to said shell 1, said dust cover 4 comprises a cover 41 and a counterweight part 42, and said dust cover 4 can open or close the opening 11 of said shell 1 under the gravity of said counterweight part 42.

The present embodiment sets a counterweight part 42 at the tail of the dust cover 4, so that when the electric grinder is used, i.e., when the opening 11 of the electric grinder faces downward, the counterweight part 42 moves downward by gravity and drives the dust cover 4 away from the opening 11 of the shell 1, and when the opening 11 of the grinder faces upward, the counterweight part 42 returns to the starting position by gravity and drives the dust block to the starting position, so that the electric grinder is closed.

Figure 3:
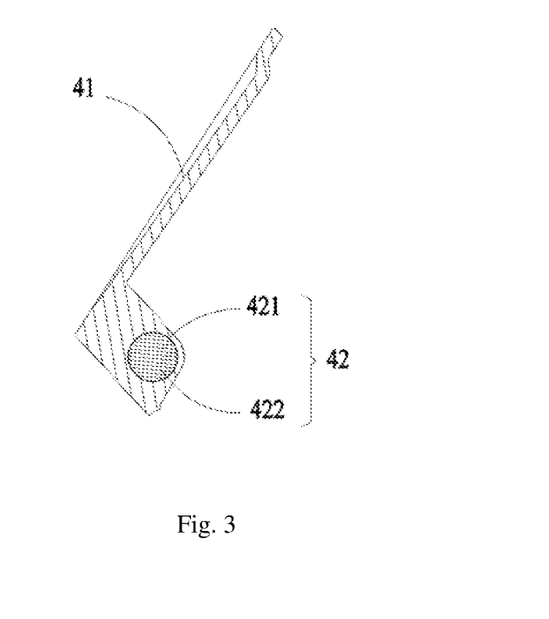
FIG. 3 is a cross-sectional structural diagram of the dust cover in the present application.

As a preferred embodiment, referring to FIG. 3, said counterweight part 42 comprises a cavity 421 and a counterweight block 422, wherein said counterweight block 422 is located in said cavity 421. In the present embodiment, said cover 41 and said counterweight part 42 are molded integrally. Except this connection mode, the counterweight block 422 can also be otherwise connected to the cover 41 of the dust cover 4, such as gluing, riveting, and embedding and integral molding. Different connection modes play the same role, and no restriction is made here.

Figure 4:
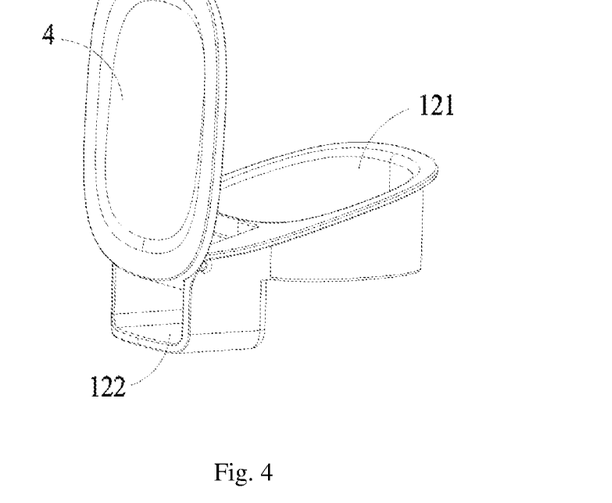
FIG. 4 is a structural diagram of matching between the dust cover and the discharge cover in the present application.

Further referring to FIG. 4, which is a structural diagram of matching between the dust cover 4 and the discharge cover 12 in the present application, in the present embodiment, said discharge cover 12 comprises a discharge part 121 and a containing part 122, wherein the lower part of said discharge part 121 can be inserted into the opening 11 of said shell 1, one end of said dust cover 4 is rotatably connected to said containing part 122, and said dust cover 4 can open or close the opening 11 of said shell 1.

The present application sets a dust cover 4 at the opening 11 of the shell 1, and the dust cover 4 can open or close the opening 11 of the shell 1, thereby preventing dust from entering the feed opening 11 effectively. In addition, one end of the dust cover 4 is rotatably connected to containing part 122. When the opening 11 of the grinder faces up, rotating the dust cover 4 can close and press against the opening 11 of the dust cover 4 automatically, thereby preventing the feed opening 11 of the electric grinder from being exposed to air when the user forgets to close the dust cover 4.

As a preferred embodiment, a rotating shaft 43 is provided on said dust cover 4, a shaft hole 123 is provided on said containing part 122, and said rotating shaft 43 and said shaft hole 123 match each other so that said dust cover 4 is rotatably connected to said discharge cover 12.

Figure 5:
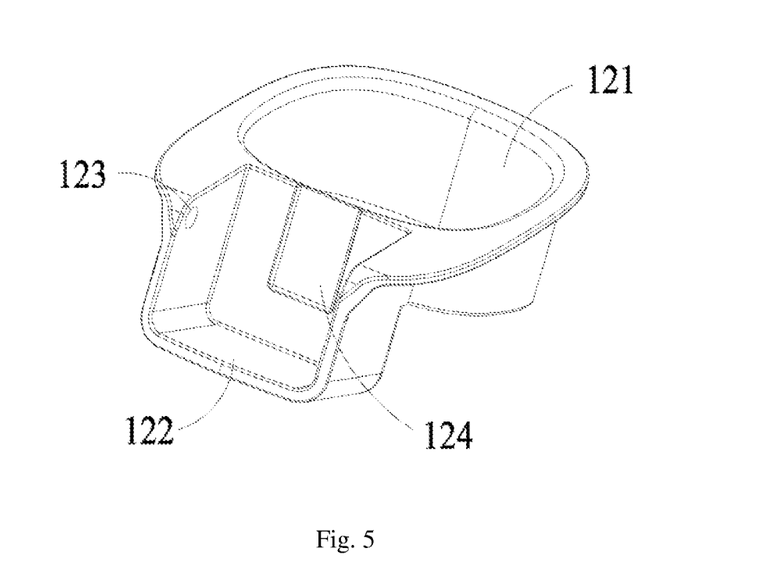
FIG. 5 is a structural diagram of the discharge cover in the present application.
Figure 6:
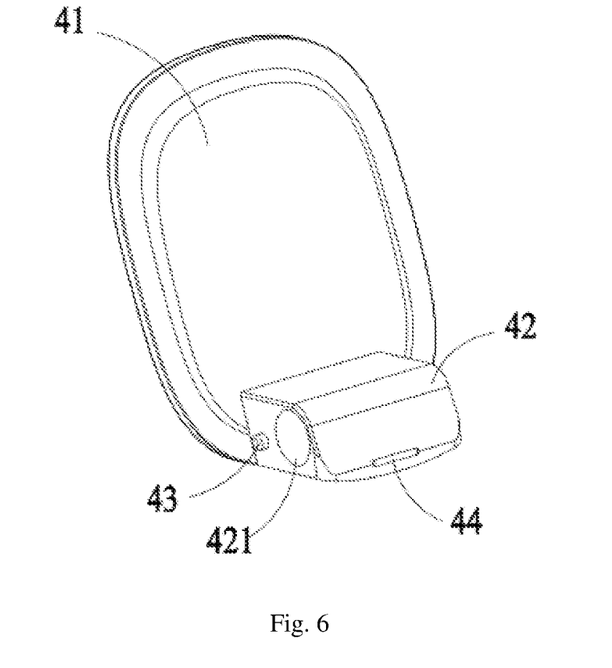
FIG. 6 is a structural diagram of the dust cover in the present application.

Referring to FIG. 5 and FIG. 6, where FIG. 5 is a structural diagram of the discharge cover 12 in the present application, and FIG. 6 is a structural diagram of the dust cover 4 in the present application; in the present embodiment, a groove 124 is provided on the outer wall of said containing part 122, and a convex rib 44 is provided at the tail of said dust cover 4. When the dust cover 4 is closed under the action of said counterweight block 422, said convex rib 44 at the tail of said dust cover 4 is engaged out of said groove 124, and when said dust cover 4 is pushed away from the opening 11 of said shell 1, said convex rib 44 at the tail of said dust cover 4 falls into said groove 124.

Figure 8:
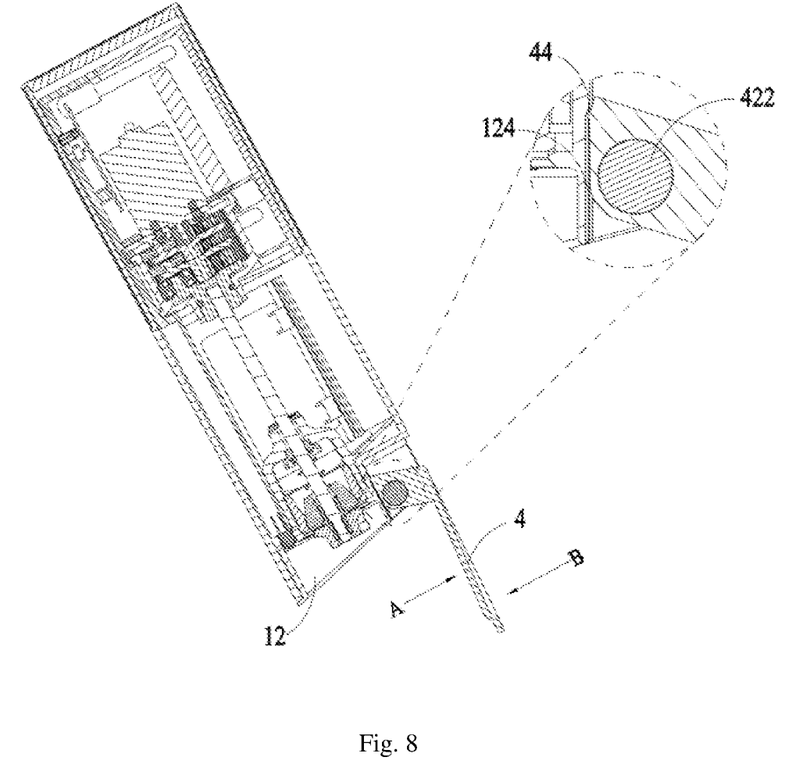
FIG. 8 is an enlarged partial view of the electric grinder in the open state in the present application.

As shown in FIG. 8, which is an enlarged partial view of the electric grinder in the open state in the present application, A is the external force that pushes the dust cover 4 away from the opening 11 of said shell 1, and B is the external force that pushes dust cover 4 toward the opening 11 of said shell 1. In the present embodiment, when the dust cover 4 is pushed by external force A away from the opening 11, the convex rib 44 at the tail of the dust cover 4 will fall into the groove 124, even if the opening 11 of the electric grinder faces upward, the dust cover 4 will not reset due to the gravity of the counterweight block 422, and when the dust cover 4 is pushed by external force B toward the opening 11, the dust cover 4 will reset.

Figure 9:
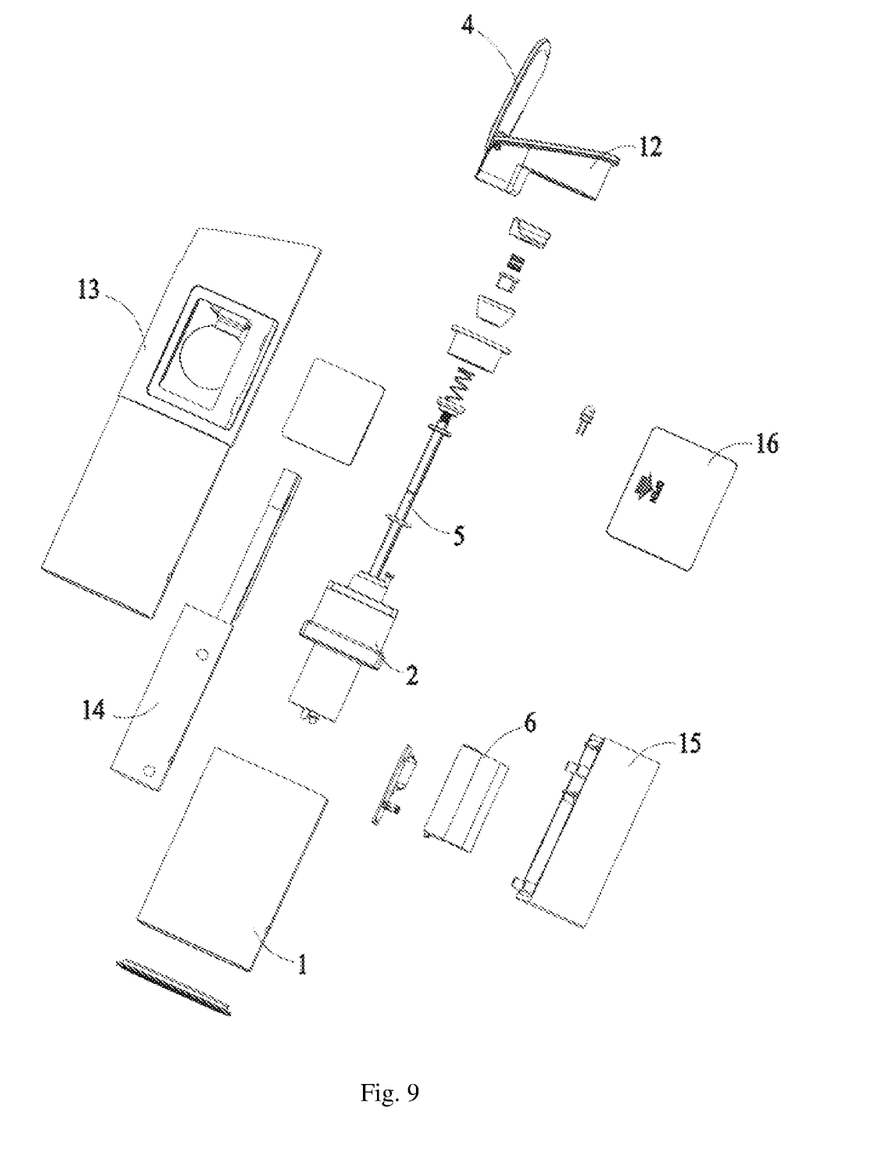
FIG. 9 is an overall exploded view of the electric grinder in the present application.

FIG. 9 is an overall exploded view of the electric grinder in the present application. In the present embodiment, said shell 1 also comprises an enclosure 13, an inner front shell 14, an inner rear shell 15 and a storage bin cover 16, wherein said enclosure 13, inner front shell 14, inner rear shell 15 and storage bin cover 16 form the storage bin 17 of the electric grinder; a battery pack 6 and a motor assembly 2 are provided under said storage bin 17, a driving shaft 5 is provided in said storage bin 17, one end of said driving shaft 5 is connected to said motor assembly 2, and the other end of said driving shaft 5 is connected to said grinding assembly 3, wherein the cross section of said driving shaft 5 is non-circular.

The electric grinder provided by the present embodiment can realize the automatic grinding of raw seasoning particles, such as pepper and sea salt particles. When the opening 11 of the electric grinder faces downward, the dust cover 4 can open automatically, and when the opening 11 of the electric grinder faces upward, the dust cover 4 can close automatically. In addition, the dust cover 4 can be pushed away from the opening 11 of the shell 1, so that the electric grinder is open, making it convenient to be used by consumers.

The above detailed description is a specific description of feasible embodiments of the present patent. These embodiments are not intended to restriction the scope of the present patent, and any equivalent embodiment or change not deviating from the present patent is included in the scope of the present patent.

It should be noted that for those ordinarily skilled in the art, some transformations and improvements can be made without departing from the conception of the present invention, all of which are within the scope of protection of the present invention. Therefore, the scope of protection of the present invention should be based on the attached claims.

It should also be understood that the components of the system and associated components may be made of any number of different materials and in many different shapes.

Additionally, it should be understood that the various inventive features described above can each be used independently of one another or in combination with other features.

It is appreciated that many changes and modifications could be made to the invention without departing from the spirit thereof. Some of these changes will become apparent from the appended claims. It is intended that all such changes and/or modifications be incorporated in the appending claims.

What is claimed is:

1. An electric grinder comprising:
   a shell comprising:
   an opening; and a discharge cover located at an edge of the opening, the discharge covr comprising a discharge part and a containing part,
a motor assembly provided in said shell,
a grinding assembly provided in said shell,
a dust cover rotatably connected to said shell, and
wherein said dust cover comprises a cover and a counterweight part,
wherein said dust cover can open or close the opening of said shell under the gravity of said counterweight part,
wherein said lower part of said discharge part is releasably inserted into the opening of said shell, and
wherein one end of said dust cover is rotatably connected to said containing part.

2. The electric grinder according to claim 1, wherein said counterweight part further comprises a cavity and a counterweight block, and
wherein said counterweight block is located in said cavity.

3. The electric grinder according to claim 2, wherein said cover and said counterweight part are integrally molded.

4. The electric grinder according to claim 1, further comprising:
a rotating shaft provided on said dust cover, and
a shaft hole provided on said containing part,
wherein said rotating shaft and said shaft hole match each other so that said dust cover is rotatably connected to said discharge cover.

5. The electric grinder according to claim 1, further comprising:
a groove provided on the outer wall of said containing part, and
a convex rib provided at the tail of said dust cover.

6. The electric grinder according to claim 5, wherein when said dust cover is closed, said convex rib at the tail of said dust cover is out of said groove, and when said dust cover is pushed away from the opening of said shell, said convex rib at the tail of said dust cover falls into said groove.

7. The electric grinder according to claim 1, wherein said shell further comprises:
an enclosure,
an inner front shell,
an inner rear shell, and
a storage bin cover,
wherein said enclosure, inner front shell, inner rear shell, and storage bin cover form a storage bin of the electric grinder.

8. The electric grinder according to claim 7, further comprising a driving shaft provided
in said storage bin,
wherein said motor assembly is located under said storage bin,
wherein one end of said driving shaft is connected to said motor assembly, and
wherein the other end of said driving shaft is connected to said grinding assembly.

9. The electric grinder according to claim 7, further comprising a battery pack provided under said storage bin.

\* \* \* \* \*